(12) United States Patent
Jang et al.

(45) Date of Patent: Nov. 3, 2009
(10) Patent No.: US 7,611,548 B2

(54) VERTICAL SUBLIMATION APPARATUS

(75) Inventors: Shyue-Ming Jang, Hsinchu (TW); Sheng Yang, Hsinchu (TW); Bang-I Liou, Hsinchu (TW); Jun-Yi Chen, Hsinchu (TW); Long-Shuenn Jean, Dalin Township, Chiayi County (TW); Chun-Te Tsai, Chiayi County (TW); Chiu-Tung Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1046 days.

(21) Appl. No.: 10/660,715

(22) Filed: Sep. 12, 2003

(65) Prior Publication Data
US 2005/0047979 A1 Mar. 3, 2005

(30) Foreign Application Priority Data
Aug. 28, 2003 (TW) .............................. 92123728 A

(51) Int. Cl.
*B01D 7/00* (2006.01)
(52) U.S. Cl. .................................... 23/294 R; 422/244
(58) Field of Classification Search ................. 422/189, 422/244; 23/294 R
See application file for complete search history.

(56) References Cited

U.S. PATENT DOCUMENTS

| 2,743,169 | A | * | 4/1956 | Hecker | 422/244 |
| 5,377,429 | A | * | 1/1995 | Sandhu et al. | 34/586 |
| 5,444,247 | A | * | 8/1995 | Trueet | 250/339.12 |
| 2002/0100710 | A1 | * | 8/2002 | Hogan | 208/13 |
| 2003/0033976 | A1 | * | 2/2003 | Coleman | 117/108 |

* cited by examiner

Primary Examiner—Wayne Langel
Assistant Examiner—Brittany M Martinez
(74) Attorney, Agent, or Firm—Bacon & Thomas, PLLC

(57) ABSTRACT

A vertical and a horizontal vacuum sublimation apparatus with high efficiency and processes thereof are provided, especially for the materials with high melting point and low vapor pressure. The vertical sublimation purification apparatus comprises a sublimation channel body, a material rack, a heating evaporation device, a condensation device, an incubating device, and a product scratching device. The horizontal sublimation purification apparatus comprises a sublimation channel body, a material carrier, a heating evaporation device, and two end pipes. The apparatuses of the present invention can be applied to the mass production of high purity chemicals, and are capable of sublimating and purifying OLED illumination layer materials including $Alq_3$, NPB and CuPc, which have high melting temperature and low vapor pressure.

15 Claims, 5 Drawing Sheets

VERTICAL SUBLIMATION APPARATUS

BACKGROUND OF THE INVENTION

1. Field of the Invention

The present invention provides a vertical and a horizontal vacuum sublimation apparatuses with high efficiency and processes, which can be applied to the mass production of high purity chemicals.

2. Description of the Related Art

With the development of IT and electrical industries, the requirements for the quality of electronic components are continuously rising. The purity of the chemicals used in electronic components is the main quality-affecting factor. Some chemicals cannot be purified via distillation process since their melting temperature is higher than their decomposition temperature. Sublimation purification is one of the processes for obtaining high purity chemicals. It can be applied to chemicals with high melting temperature and sublimation characteristics. It is based on these sublimation characteristics that purification can be realized via high vacuum heating sublimation process, where contaminants must be blocked off from the sublimation process. Products with extremely high purity can only be obtained under a strictly controlled operation environment to produce high quality electronic components. Some illumination layer materials are used in the production of OLED components, such as electron transport layer (ETL) materials: Aluminum Tri (8-Hydroxyquinolinate) ($Alq_3$); hole injection layer (HIL) materials: Copper Phthalocyanine (CuPc); hole transport (HTL) layer materials: N,N'-bisphenyl-N,N'-bis(1-naphthyl)-benzidine (abbreviated as NPB), etc. The purification of these chemicals cannot be realized through distillation process since their melting temperature is higher than their decomposition temperature. However, high purity products can be obtained through vacuum sublimation process based on their sublimation characteristics to produce high quality electronic components.

Although the earlier approach of promoting sublimation vapor with noble gases could lower the requirements on the vacuum degree of the system, but the residual substances that cannot be sublimated in the sublimation materials have low apparent density, so they are easy to flow with noble gases, which causes the contamination of products by the flowing residues. High vacuum system is therefore designed to overcome the above disadvantages. In addition, the vapor pressure of some materials, such as CuPc, is extremely low, and a system with vacuum degree of $10^{-6}$ mbar temperature of 600° C. is required. Otherwise, these materials can not be evaporated. If the pressure of the system were too high, the vapor from the sublimation process would collide with the residual air in the system, causing the sublimated materials to fall back into the evaporation tank and creating partial vaporization-condensation circulation, thus resulting in difficulties for product output. Recently, with the continuously increasing demand for such high purity chemicals, materials produced by small-scale purification apparatuses can no longer meet the demand because of their uneven quality of each product group and limited productivity. As a result, it is necessary to design a vacuum sublimation apparatus that can be applied to mass production.

Instead of considering the purity of products and the convenient operational approaches required by mass production, the processes revealed by existing patent documents primarily are concerned with improving sublimation efficiency. In the manufacturing process of OLED materials, the purity of the materials is the key factor to a successful production. How to obtain high purity sublimated products from mass production is the main challenge of these apparatuses.

The apparatus of Japanese patent JP10158820, owned by Japanese company—ULVAC JAPAN, can be utilized to purify photoelectric materials, such as N, N'-Bisphenyl-N,N'-bis(3-methylphenyl)-benzidine (TPD). The design aims at improving heating evenness and rate by using noble gases as heat carriers. This process is usually not applied to the purification of the chemicals with low vapor pressure, such as CuPc. Since products are easily contaminated by flowing residues, high vacuum environment cannot be realized. In addition, U.S. Pat. No. 5,377,429, owned by American company—Micron Semiconductor, disclosed a sublimation device to purify the organic metal chemicals employed in the semiconductor industry, such as tetrakis-dimethyl-amino titanium[$Ti(N(CH_3)_2)_4$] (abbreviated as TDMAT). The unique features of the design are: vaporization and condensation taking place in the same vertical vessel. Raw materials located at the bottom of the vessel are mixed with ceramic beads which act as heat carriers. The sublimation vessel consisting of a mixing device increases the surface area for heat conduction. During the purification process, vapor rises and then condenses on the upper part of the vessel wall, and products can be scratched off after sublimation. However, the raw materials are likely to be spattered, thus causing contamination on products during the mixing process, and products thereof are also difficult to collect. Japanese patent JP200093701, owned by Japanese company—Nippon Steel Chemical Group, outlined an apparatus with separate vaporization and condensation devices. Temperatures thereof are individually controlled by induction heating to purify photoelectric materials, such as $Alq_3$. However, such process cannot apply to mass production due to its poor heating efficiency and incapability to reach the required sublimation temperature (500° C.). U.S. Pat. No. 4,407,488, owned by German company—Leybold-Heraeus GmbH, did not point out what types of materials can be purified by the apparatus. The disclosed sublimation system consists of multiple groups of vaporization plates. Under a vacuum environment, heat is absorbed by plate edges and distributed on plate surfaces to heat and vaporize thin layers of materials on the plate surfaces. This particular heating process is likely to produce uneven temperature profile on plate surfaces, thus making the purity of products hard to be improved.

SUMMARY OF THE INVENTION

To overcome the well-known problems of the sublimation technique mentioned above, the present invention provides a vertical and a horizontal vacuum sublimation apparatuses and processes thereof. The present invention is suitable for the mass production of high purity chemicals, and overcomes the foregoing drawbacks of conventional sublimation technologies.

The object of the present invention is to provide a vertical sublimation apparatus comprising a sublimation channel body, a material rack for storing materials that will be evaporated, a heating evaporation device surrounding the evaporation pipe for controlling the heating temperature according to different materials for evaporating said materials, a condensation device surrounding the upper part of the sublimation channel body for controlling the condensation temperature required by different evaporated materials, an incubating device for maintaining the temperature of the vapor channels and products, and a product scratching device.

The structure of the above-mentioned material rack comprises a plurality of rails and fixed rings, wherein the rails are fixed by two fixed rings. The material rack is located in the evaporation pipe for storing materials that will be evaporated.

The above-mentioned incubating device comprises a vapor channel incubating device and a product incubating device. The vapor channel incubating device, which surrounds the outlet port of the channels, maintains the temperature of the sublimated vapor which can transport continuously into the sublimation channel body. The product incubating device, which surrounds the lower part of the sublimation channel body, prevents the accumulation of the sublimated vapor.

The above-mentioned product scratching device comprises a central axis for shifting up/down and/or rotating the scratching device, fixed rings, central support and sawtooth, wherein the sawtooth is located near the fixed rings beneath the central support to scratch off the condensed products from the wall of the sublimation channel body.

A product storage tank is formed underneath the sublimation channel body for storing products. The condensed products, when scratched off by the scratching device, will fall into the product storage tank and be collected later.

The above-mentioned vertical sublimation apparatus further comprises heat shield devices, made of quartz wool, are located at the two ends of the sublimation channel body and at one end of the evaporation pipe further away from the sublimation channel body. The devices serve to maintain a certain temperature inside the sublimation apparatus.

The above-mentioned vertical sublimation apparatus further comprises sealing caps located at the end of the channels with heat shield device and locked by O-rings to prevent leakage.

Another object of the present invention is to provide a horizontal sublimation apparatus, which comprises a sublimation channel body, a material carrier located inside the above-mentioned sublimation channel body for storing materials that will be evaporated, a heating evaporation device which surrounds the sublimation channel body for controlling the heating temperature according to different materials for evaporating said materials, two end pipes located at the two ends of the above-mentioned sublimation channel body, wherein the pipe at one end connects to the vacuum extraction system, whereas the pipe at the other end is sealed, and pipe-end sealing devices for connecting the two ends of the above-mentioned sublimation channel body with the two end pipes to achieve perfect sealing for the sublimation channel body.

The above-mentioned material carrier could be in the shape of a boat, a tank, a circular plate or any other forms that can be used to store materials without particular restrictions.

The above-mentioned pipe-end sealing devices are screw nuts. When connecting the sublimation channel body with the two end pipes, the perfect sealing can be realized by combing a screw nut with an O-ring, and then screwing the screw nut into the thread at the two ends of the sublimation channel body until it is tightened up.

Another object of the present invention is to provide a high-efficiency vapor collection device disposed between the sublimation channel body and the vacuum system of the two said sublimation apparatuses, for condensing the uncondensed and ionized vapor via low temperature, thus preventing the vacuum pump from being contaminated, so that the vacuum pump can be put to long-term use without being necessary to be cleaned.

The above-mentioned vapor collection device comprises a collecting bottle filled with wires for expanding the contacting surface for vapor condensed; an inlet pipe for connecting with the above-mentioned vacuum sublimation apparatus, so the ionized vapor can be guided into the collecting bottle; and an exhaust pipe for connecting with the vacuum extraction system.

Another object of the present invention is to provide a vacuum sublimation purification process, applied to the vertical sublimation purification apparatus, which comprises the following steps: placing materials on the material rack; turning on the vacuum extraction device; turning on the heating evaporation device to achieve the required sublimation temperature of the materials; turning on all incubating devices to maintain the condensation temperature; scratching and collecting products at a regular time interval during the evaporation process; cooling down the temperature after evaporation is completed, and taking out products from the product storage tank.

Another object of the present invention is to provide a vacuum sublimation purification process applied to the horizontal sublimation purification apparatus, which comprises following steps: placing materials in the material carrier; placing the material carrier at the center of the sublimation channel body; tightening up and sealing the two end pipes; turning on the vacuum extraction device; turning on the heating evaporation device to control the temperature between the center and the two ends of the sublimation channel body; cooling down the temperature and breaking the vacuum after evaporation is completed, then scratching and collecting products.

The conditions of employing the vertical or horizontal sublimation apparatus of the present invention to purify $Alq_3$ through sublimation are: evaporation temperature is 350~450° C., and the preferable evaporation temperature is 370~400° C. Condensation temperature is 250~350° C., and the preferable condensation temperature is 270~320° C. Evaporation temperature is 50~100° C. higher than condensation temperature. System pressure is $1~10^{-6}$ mbar, and the preferable system pressure is $0.3~1\times10^{-6}$ mbar.

The conditions of employing the vertical or horizontal sublimation apparatus of the present invention to purify NPB through sublimation are: evaporation temperature is 250~350° C., and the preferable evaporation temperature is 270~300° C. Condensation temperature is 150~250° C., and the preferable condensation temperature is 170~220° C. Evaporation temperature is 30~80° C. higher than condensation temperature. System pressure is $0.1~10^{-6}$ mbar, and the preferable system pressure is $0.03~1\times10^{-6}$ mbar.

The conditions of employing the vertical or horizontal sublimation apparatus of the present invention to purify CuPc through sublimation are: evaporation temperature is 500~650° C., and the preferable evaporation temperature is 550~600° C. Condensation temperature is 400~500° C., and the preferable condensation temperature is 430~480° C. Evaporation temperature is 50~100° C. higher than condensation temperature. System pressure is $0.1~1\times10^{-6}$ mbar, and the preferable system pressure is $0.03~1\times10^{-6}$ mbar.

The vacuum sublimation purification process of the above-mentioned vertical and horizontal sublimation apparatuses allows the vacuum to be relieved, and the products to be taken out after the materials have completely sublimated and purified.

The fundamental object of the present invention is to create a high efficiency vacuum heating sublimation apparatus, which can be applied to mass production. High purity products can be produced since the sublimation temperature and the vacuum degree could reach 650° C. and $10^{-6}$ mbar respectively, and the heating and condensation temperatures can be adjusted and controlled. The thermal conductivity and the vacuum degree of the apparatuses of the present invention meet the standards of small-scale apparatuses, while the convenient and sustainable operational approach thereof meets the requirement of mass production. In addition, the apparatuses are capable of sustaining appropriate product purity, conducting commercial operations and producing large quantities of high purity products.

DETAILED DESCRIPTION OF THE PREFERRED EMBODIMENT

Figure 1:
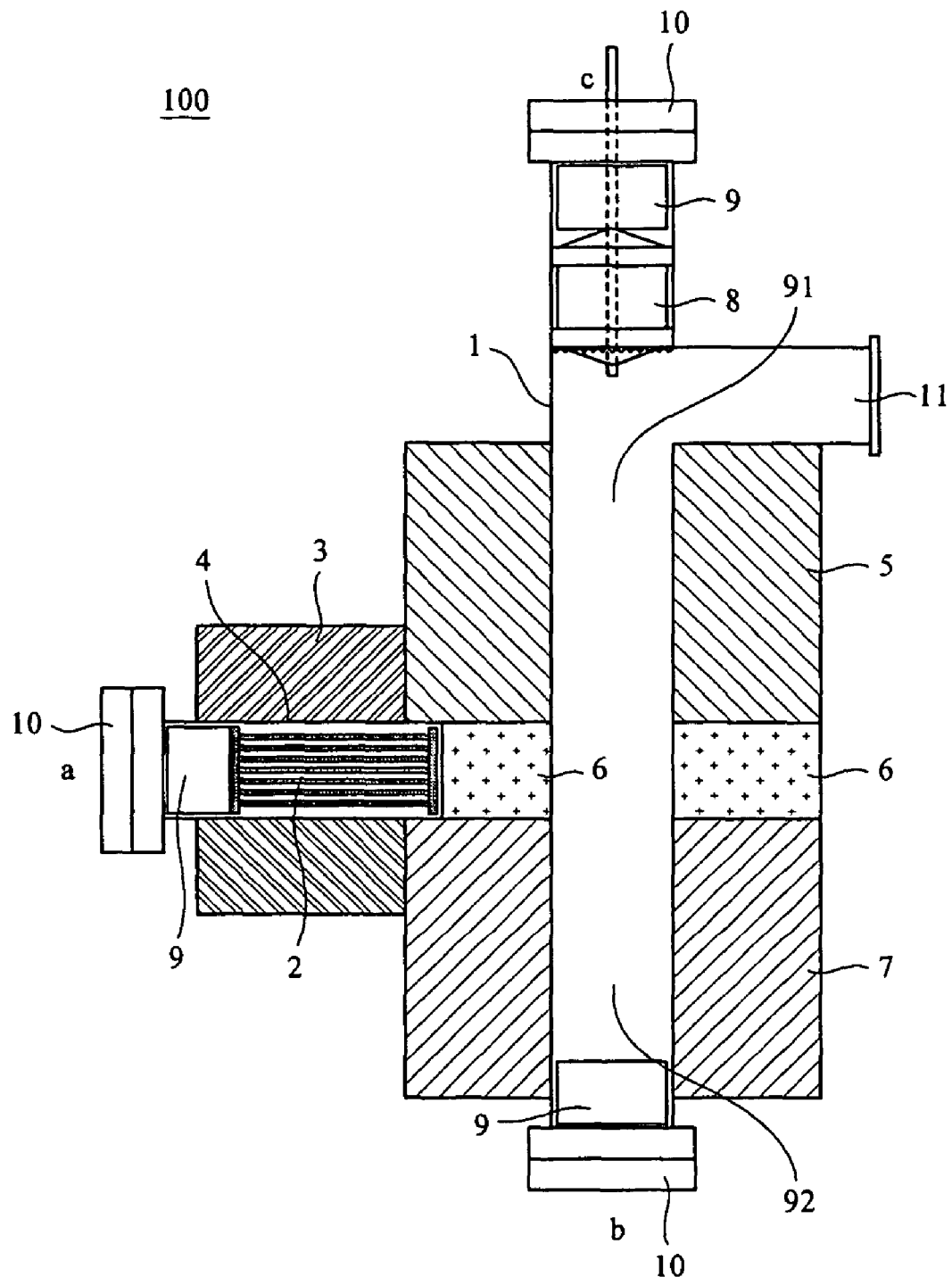
FIG. 1 shows a schematic diagram of the vertical sublimation apparatus of the present invention.

FIG. 1 illustrates a vertical sublimation apparatus 100 of the present invention. According to FIG. 1, the apparatus comprises a high temperature and corrosion resistant sublimation channel body 1, which is a hollow cylinder made of quartz glass; a material rack 2 for storing materials that will be evaporated; a heating evaporation device 3, surrounding the evaporation pipe 4, for controlling the heating temperature based on different materials and realizing evaporation; a condensation device 5, surrounding the upper part of the sublimation channel body 1, for controlling the condensation temperature required by different evaporated materials to achieve high purity; an incubating device 6, 7, which consists of a vapor channel incubating device 6 and a product incubating device 7. The vapor channel incubating device 6, surrounding the outlet port of the vapor channel (not shown on the figure), keeps the temperature of sublimated vapor and transports vapor continuously into the sublimation channel body 1. The product incubating device 7, surrounding the lower part of the sublimation channel body 1, avoids accumulation of some of the sublimated vapor; and a product scratching device 8.

The above-mentioned vertical sublimation apparatus 100 further comprises heat shield devices 9 formed by stuffing quartz wool into cylindrical containers made of quartz, with all ends thereof being sealed after air extraction, so the internal pressure thereof reaches below $10^{-6}$ mbar in a vacuum state. The heat shield devices 9 are then respectively placed into the b, c ends of the above-mentioned sublimation channel body 1 and the a end of the evaporation pipe 4 to achieve heat-shielding effect. In addition, the above-mentioned vertical sublimation apparatus 100 further comprises sealing caps 10, located at the end of channel a, b, c, and locked by O-rings (not shown on the figure) to prevent leakage. With the vertical sublimation purification apparatus 100 of the present invention, appropriate vacuum condition can be achieved by extracting air through the vacuum extraction mouth 11, which is connected to the sublimation channel body 1.

Figure 2A:
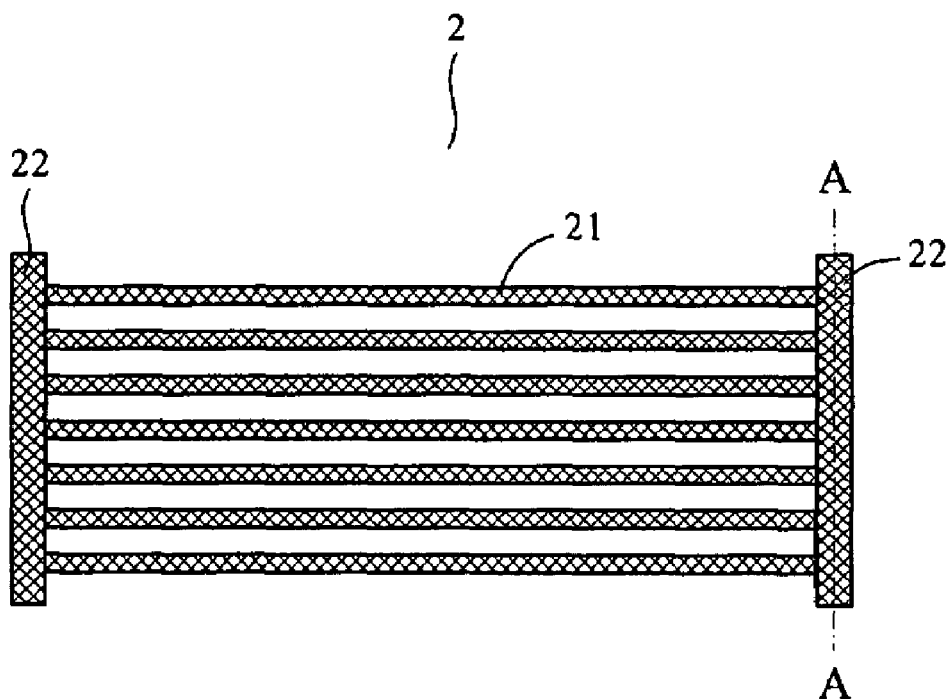
FIG. 2A shows a side view of the material rack of the present invention.
Figure 2B:
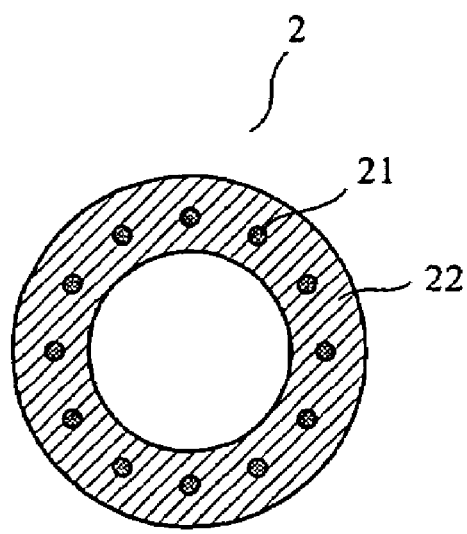
FIG. 2B shows a sectional view of the material rack of the present invention dissecting along the A-A section line shown in FIG. 2A.

FIG. 2A outlines the detailed structure of the above-mentioned material rack 2. FIG. 2B is the sectional view of FIG. 2A when dissecting along the A-A line. The material rack 2 comprises of a plurality of rails 21 and fixed rings 22, where all rails 21 are fixed by two fixed rings 22. The material rack 2 is located in the evaporation pipe 4 to store materials that will be evaporated. First, the materials in the gap are placed between the material rack 2 and the evaporation pipe 4 through the a end of the evaporation pipe shown in FIG. 1. Then the temperature of the heating evaporation device 3 is controlled to heat and evaporate the materials. When the sublimated vapor has diffused into the condensation region 91 (the upper part of the sublimation channel body 1), it will be condensed on the walls of the channel under the temperature controlled by the condensation device 5. As the thickness of the condensed materials has reached a certain limit, temperature can no longer be lowered to the condensation point due to the poor heat dissipation capability of the materials. Therefore it is necessary to turn on the product scratching device 8 at a regular time interval to scratch off the sublimated products from the surface of the condensation region 91 and push them into the product storage tank 92 via twisting and downward pushing operation. A product storage tank 92 is formed below the above-mentioned sublimation channel body 1. Without relieving the vacuum, the product scratching operation is repeated until all the materials stored in the material rack 2 have been evaporated. In the end, large quantities of high purity products can be retrieved by relieving the vacuum and opening the channel on the b end of the sublimation channel body 1.

Figure 3A:
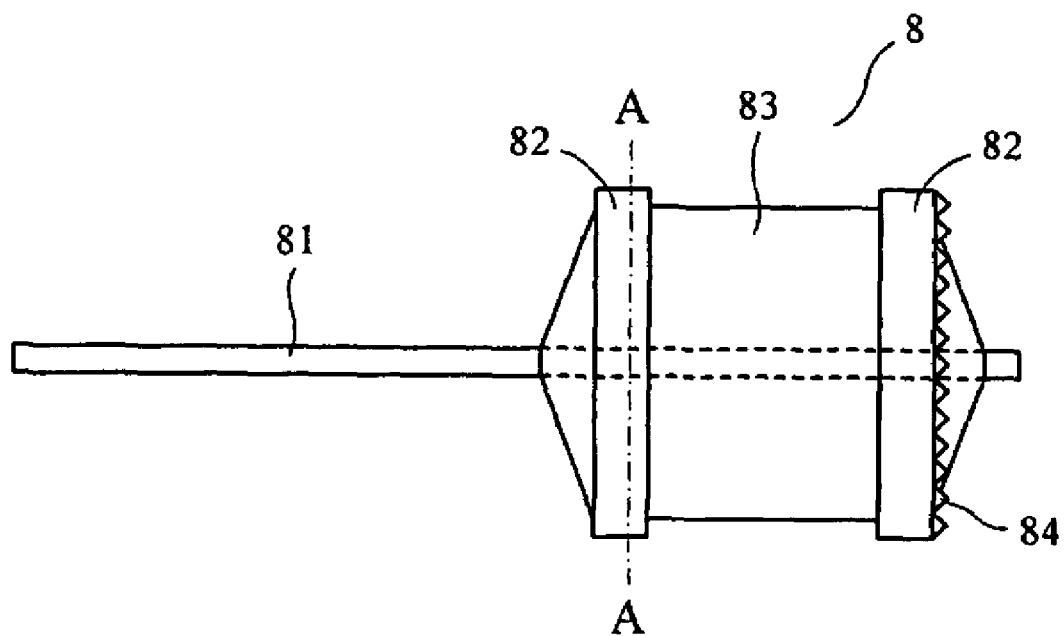
FIG. 3A shows a side view of the scratching device of the present invention.
Figure 3B:
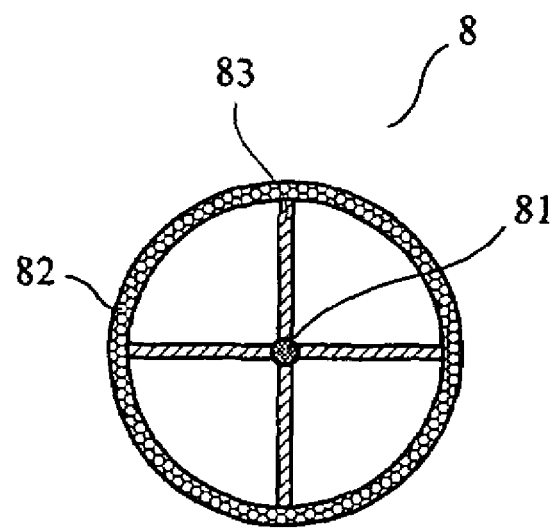
FIG. 3B shows a sectional view of the scratching device of the present invention dissecting along the A-A section line shown in FIG. 3A.

FIG. 3A outlines the detailed structure of the above-mentioned product scratching device 3. FIG. 3B is the sectional view of FIG. 3A dissecting along the A-A line. The scratching device 8 comprises a central axis 81 for shifting up/down or rotating the position of the scratching device 8; two fixed rings 82; a central support 83 made by crossing two glass plates; and sawtooth 84, located near the fixed rings 82 beneath the central support 83, for scratching off the products condensed on the walls of the sublimation channel body 1.

Figure 4:
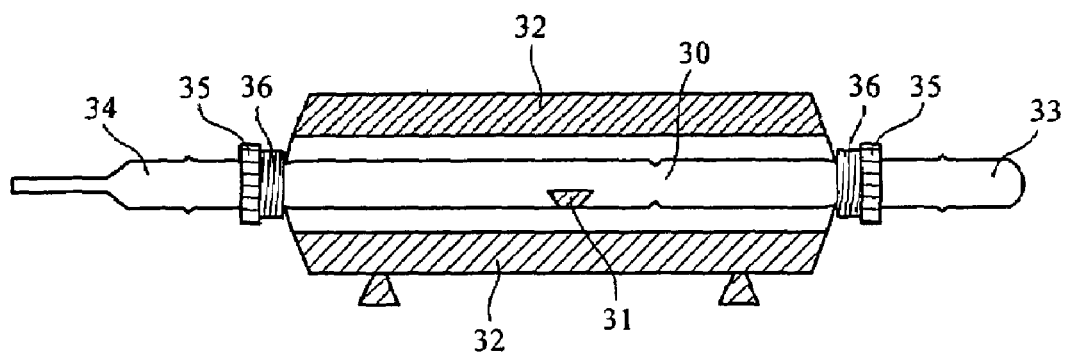
FIG. 4 shows a schematic diagram of the horizontal sublimation apparatus of the present invention.

FIG. 4 illustrates a horizontal sublimation apparatus 200 of the present invention. According to FIG. 4, the apparatus comprises a sublimation channel body 30; a material carrier 31 located inside the sublimation channel body 30 for storing materials that will be evaporated; a heating evaporation device 32, including the above-mentioned sublimation channel body 30, for controlling the heating temperature based on different materials and realizing evaporation; two end pipes 33 and 34, located at the two ends of the above-mentioned sublimation channel body 30, where pipe 34 connects with the vacuum extraction system, pipe 33 is sealed; and a pipe-end sealing device 35 for connecting the two ends of the above-mentioned sublimation channel body 30 with the two end pipes 33 and 34 to achieve perfect sealing effect for the sublimation channel body 30.

Figure 5:
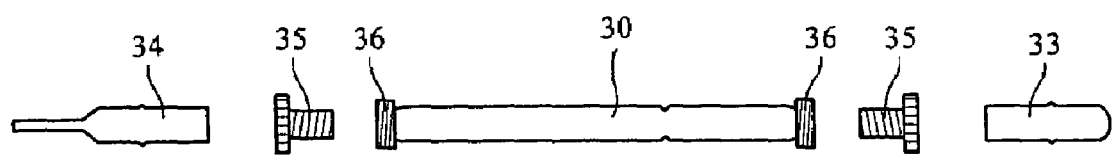
FIG. 5 shows a separate view of the sublimation channel body, two end pipes, and pipe-end sealing devices respectively inside the horizontal sublimation apparatus.

FIG. 5 provides decomposition diagrams for the above-mentioned sublimation channel body 30, two end pipes 33, 34, and pipe-end sealing device 35. When connecting the sublimation channel body 30 with the two end pipes 33 and 34, perfect sealing effect can be realized by combing a screw nut with an O-ring and by screwing the screw nut into the thread 36 between the two ends of the sublimation channel body 30.

Figure 6:
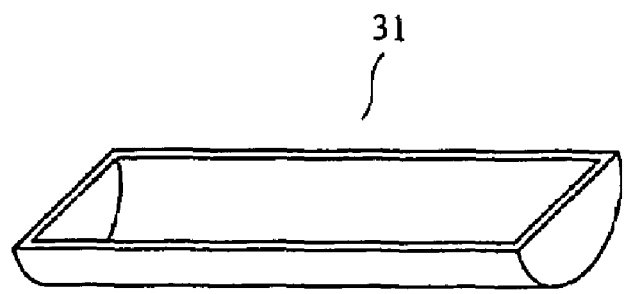
FIG. 6 shows a three-dimensional view of the material carrier of the present invention.

FIG. 6 outlines the above-mentioned material carrier 31. First, one can place materials in the material carrier, and then place the material carrier at the center of the sublimation channel body 30, tighten up and seal the two end pipes, extract air by connecting pipe 34 with the vacuum system, turn off and lock the heating evaporation device 32, and heat materials at controlled temperature. The heated materials will diffuse into the two ends of the sublimation channel body 30 and condense in the regions with lower temperatures. Finally, one can cool down the temperature and relieve the vacuum after all materials have been evaporated to scratch and collect products.

Figure 7:
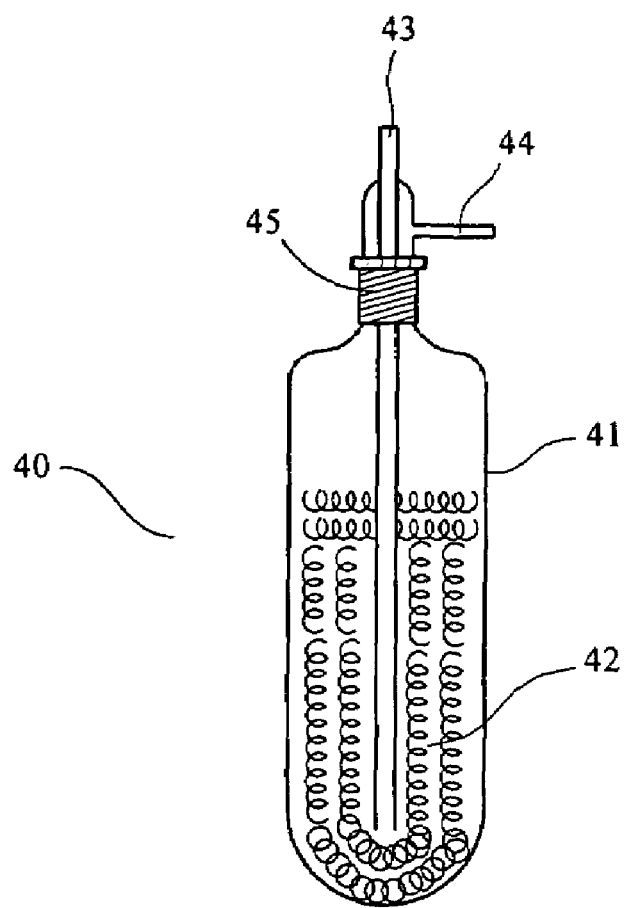
FIG. 7 shows a schematic diagram of the vapor collection system of the present invention.

FIG. 7 outlines the vapor collection device of the present invention. According to FIG. 7, the device compromises a collecting bottle 41 filled with wires 42 for expanding the contacting surface between vapor and cold surface to increase collecting efficiency; an inlet pipe 43, tightened up by a crew nut 45 combined with an O-ring, for connecting the vacuum sublimation apparatus, so uncondensed vapor can be guided into the collecting bottle; and an exhaust pipe 44 for connecting the vacuum extraction system. The vapor collection device 40, disposed between the sublimation channel body and the vacuum system of the two above-mentioned sublimation apparatuses (the vapor collection device 40 is placed in the barrel which contains liquid nitrogen), is to condense uncondensed vapor via low temperature, thus preventing the vacuum pump from being contaminated, so the vacuum pump can be put to long-term use without being necessary to be cleaned.

The above-mentioned vapor collection device is an additional feature that can be installed between the sublimation apparatus of the present invention and the vacuum system if necessary. Since protecting the vacuum system is an important issue, it is highly recommended to install the vapor collection device which serves to avoid the contamination of the vacuum system by the vapor overflowed from the sublimation channel body.

Another object of the present invention is to provide a vacuum sublimation purification process, which applies to the above-mentioned vertical sublimation purification apparatus. The following steps are included in the method: placing materials on the material rack; turning on the vacuum extraction device; turning on the heating evaporation device to achieve the required sublimation temperature of the materials; turning on all incubating devices, such as the vapor channel and the product incubating devices, to maintain the condensation temperature. In addition, when the thickness of the condensed materials has reached a certain limit, temperature can no longer be lowered to the condensation point during the evaporation process due to their poor heat dissipation capability. Therefore, it is necessary to scratch and collected products at a regular time interval. High purity products can be obtained by cooling down the temperature and relieving vacuum, and then taking out products from the product storage tank after evaporation is completed.

Another object of the present invention is to provide a vacuum sublimation purification process, which applies to the above-mentioned horizontal sublimation purification apparatus. The following steps are included in the method: placing materials in the material carrier; placing the material carrier at the center of the sublimation channel body; tightening up and seal the two end pipes; turning on the vacuum extraction device; and turning on the heating evaporation device to control the temperature between the center and the two ends of the sublimation channel body. In the end, high purity products can be obtained by cooling down the temperature and relieving vacuum, and then scratching and collecting products after evaporation is completed.

The following examples are used to further prove the advantages of the present invention. They are not listed to limit the claims of the present invention.

Example 1

250 grams of $Alq_3$ was placed in the evaporation region of the vertical sublimation purification apparatus, then closed the sealing cap of the pipe, extracted air until vacuum degree reaches $3.2\times10^{-5}$ mbar, heated the heating evaporation device and maintained its temperature at 350° C., maintained the temperature of the condensation device at 260° C., maintained the temperature of the vapor channel incubating device at 330° C., maintained the temperature of the product incubating device at 120° C., and turned on the product scratching device at a regular time interval during the condensation process. When sublimation has completed, pressure has dropped to the initial value, and all heating evaporation and incubating devices have been turned down. 170.5 g of products and 79.1 g of residues was collected after cooling, achieving 68.2% yield after sublimation.

Example 2

200 grams of NPB was placed in the boat shaped material carrier of the vertical sublimation purification apparatus, then placed the material carrier at the center of the sublimation channel body, twisted and tightened the two end pipes until they are sealed, extracted air by connecting the end pipe at the air extraction end with the vacuum system until the vacuum degree reaches $4.5\times10^{-6}$ mbar, raised the temperature of the center in the heating evaporation device and maintain it at 330° C., and maintained the exterior temperature at 220° C. After three hours of sublimation, 147.0 g of products and 52.4 g of residues was retrieved, achieving 73.5% yield after sublimation.

Example 3

330 grams of CuPc was placed in the boat shaped material carrier of the vertical sublimation purification apparatus, then placed the material carrier at the center of the sublimation channel body, twisted and tightened two end pipes until they were sealed, extracted air by connecting the end pipe at the air extraction end with the vacuum system until vacuum degree reaches $9.2\times10^{-6}$ mbar, raised the temperature of the center in the heating evaporation device and maintained it at 600° C., and maintained the exterior temperature at 500° C. After sublimation, 241.8 g of products and 84.7 g of residues was retrieved, achieving 73.2% yield after sublimation.

In summary, the sublimation purification apparatuses and processes of the present invention have clear advantages compared to the well-known ones. It provides convenient operational processes and meets the requirement of mass production with its improved apparatuses. In addition, the apparatus is capable of sustaining appropriate product purity, conducting business operations and producing large quantities of high purity products.

Although successful implementations of the present invention have been listed above, they do not limit the applications of the present invention. Anyone who is familiar with the present invention can make modifications and improvements provided that their actions are within the spirit and scope of the present invention. The protected scope of the present invention is referenced in the later attached claims.

What is claimed is:

1. A vertical sublimation apparatus, comprising:
   a sublimation channel body;
   a material rack for storing materials that will be evaporated;
   a heating evaporation device surrounding an evaporation pipe to control heating temperatures according to different materials for evaporating said materials;
   a vapor channel for transporting said evaporated materials into said sublimation channel body;
   a vapor channel incubating device surrounding said vapor channel for maintaining the temperature of said vapor channel;
   a condensation device surrounding the upper part of said sublimation channel body for controlling condensation temperatures required by different evaporated materials;
   a product incubating device for maintaining the temperature of end products;
   and
   a product scratching device;
   wherein said heating evaporation device, said vapor channel, said condensation device, said vapor channel incubating device and said product incubating device are individually configured.

2. The vertical sublimation apparatus as claimed in claim 1, wherein the structure of said material rack comprises a plurality of rails and fixed rings, and said rails are fixed by two fixed rings and located in said evaporation pipe for storing materials ready to be evaporated.

3. The vertical sublimation apparatus as claimed in claim 1, wherein said vapor channel incubating device surrounds an outlet port of said vapor channel to maintain the temperature of the sublimated vapor and transports said sublimated vapor continuously into said sublimation channel body.

4. The vertical sublimation apparatus as claimed in claim 3, wherein said product incubating device surrounds the lower part of said sublimation channel body to avoid accumulation of said sublimated vapor.

5. The vertical sublimation apparatus as claimed in claim 1, wherein said product scratching device comprises a central axis for shifting up and down and/or rotating said product scratching device, fixed rings, central support and sawtooth.

6. The vertical sublimation apparatus as claimed in claim 5, wherein said sawtooth is located near said fixed rings beneath said central support for scratching off condensed products from the wall of said sublimation channel body.

7. The vertical sublimation apparatus as claimed in claim 1, wherein said lower part of said sublimation channel body is formed as a product storage tank for collecting said condensed products falling therein after being scratched off by said scratching device.

8. The vertical sublimation apparatus as claimed in claim 1, further comprising heat shield devices made of quartz wool and located at two ends of said sublimation channel body with one end of said evaporation pipe being further away from said sublimation channel body for maintaining a certain temperature inside said sublimation apparatus.

9. The vertical sublimation apparatus as claimed in claim 1, further comprising sealing caps located at each end of said channels with heat shield devices placed therein and locked by O-rings to prevent leakage.

10. A vacuum sublimation purification process applied to said vertical sublimation apparatus of claim 1, comprising the following steps:
    placing materials on said material rack;
    turning on said vacuum extraction device to vacuum;
    turning on said heating evaporation device to achieve the required sublimation temperature of materials;
    turning on all incubating devices to maintain the condensation temperature;
    scratching and collecting products at a regular time interval during the evaporation process; and
    cooling down the temperature after evaporation is completed and taking out products from said product storage tank, said steps being applied to the vertical sublimation apparatus of claim 1.

11. The vacuum sublimation purification process as claimed in claim 10, wherein conditions of sublimation required for purifying $Alq_3$ are: evaporation temperature being 350~450° C., condensation temperature being 250~350° C., evaporation temperature being 50~100° C. higher than condensation temperature, and system pressure being $1$~$1\ 10^{-6}$ mbar.

12. The vacuum sublimation purification process as claimed in claim 10, wherein conditions of sublimation for purifying NPB are: evaporation temperature being 250~350° C., condensation temperature being 150~250° C., evaporation temperature being 30~80° C. higher than condensation temperature, and system pressure being $0.1$~$1\ 10^{-6}$ mbar.

13. The vacuum sublimation purification process as claimed in claim 10, wherein conditions of sublimation for purifying CuPc are: evaporation temperature being 500~650° C., condensation temperature being 400~500° C., evaporation temperature being 50~100° C. higher than condensation temperature, and system pressure being $0.1$~$1\ 10^{-6}$ mbar.

14. The vacuum sublimation purification process as claimed in claim 11, wherein conditions of sublimation for purifying NPB are: evaporation temperature being 250~350° C., condensation temperature being 150~250° C., evaporation temperature being 30~80° C. higher than condensation temperature, and system pressure being $0.1$~$1\ 10^{-6}$ mbar.

15. The vacuum sublimation purification process as claimed in claim 11, wherein conditions of sublimation for purifying CuPc are: evaporation temperature being 500~650° C., condensation temperature being 400~500° C., evaporation temperature being 50~100° C. higher than condensation temperature, and system pressure being $0.1$~$1\ 10^{-6}$ mbar.

* * * * *

UNITED STATES PATENT AND TRADEMARK OFFICE
CERTIFICATE OF CORRECTION

PATENT NO. : 7,611,548 B2  Page 1 of 1
APPLICATION NO. : 10/660715
DATED : November 3, 2009
INVENTOR(S) : Jang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1409 days.

Signed and Sealed this

Twelfth Day of October, 2010

David J. Kappos
*Director of the United States Patent and Trademark Office*